United States Patent [19]

Cullick

[11] Patent Number: 4,609,043

[45] Date of Patent: Sep. 2, 1986

[54] ENHANCED OIL RECOVERY USING CARBON DIOXIDE

[75] Inventor: Alvin S. Cullick, Dallas, Tex.

[73] Assignee: Mobil Oil Corporation, New York, N.Y.

[21] Appl. No.: 663,259

[22] Filed: Oct. 22, 1984

[51] Int. Cl.$^4$ .............................................. E21B 43/22
[52] U.S. Cl. .................................. 166/268; 166/274; 252/8.554
[58] Field of Search ................ 166/273–275, 166/252, 268; 252/8.55 R, 8.55 D

[56] References Cited

U.S. PATENT DOCUMENTS

| | | | |
|---|---|---|---|
| 2,875,830 | 3/1959 | Martin | 166/273 X |
| 3,334,688 | 8/1967 | Blackwell et al. | 166/252 X |
| 3,811,502 | 5/1974 | Burnett | 166/252 |
| 3,811,503 | 5/1974 | Burnett et al. | 166/252 |
| 4,059,154 | 11/1977 | Braden, Jr. et al. | 166/273 X |
| 4,124,073 | 11/1978 | Wier | 166/272 |
| 4,323,463 | 4/1982 | Morduchowitz | 166/275 X |
| 4,338,203 | 7/1982 | Hunter | 166/275 X |
| 4,389,320 | 6/1983 | Clampitt | 166/272 X |
| 4,406,799 | 9/1983 | Hunter | 166/275 X |
| 4,502,538 | 3/1985 | Wellington et al. | 166/252 |

*Primary Examiner*—Stephen J. Novosad
*Attorney, Agent, or Firm*—Alexander J. McKillop; Michael G. Gilman; Charles J. Speciale

[57] ABSTRACT

An enhanced oil recovery process in which carbon dioxide is injected into the oil-bearing formation under supercritical conditions to act as a solvent for the oil. Mobility of the carbon dioxide is controlled by the use of a dissolved polymer whose solubility is enhanced by the use of an entrainer comprising a polar organic compound such as an alcohol or a glycol.

13 Claims, No Drawings

ENHANCED OIL RECOVERY USING CARBON DIOXIDE

BACKGROUND OF THE INVENTION

This invention relates to the recovery of oil from subterranean reservoirs using carbon dioxide as a recovery agent and more particularly, to a method for controlling the mobility of carbon dioxide in such reservoirs.

In the recovery of oil from subterranean, oil-bearing formations, it is usually possible to recover only a limited proportion of the original oil present in the reservoir by the so-called primary recovery methods which utilize the natural formation pressure to produce the oil through suitable production wells. For this reason, a variety of supplementary recovery techniques have been employed, directed either to maintaining formation pressure or to improving the displacement of the oil from the porous rock matrix. Techniques of this kind have included formation pressurization, thermal recovery methods such as steam flooding and in situ combustion, water flooding and miscible flooding techniques.

In miscible flooding operations, a solvent is injected into the reservoir to form a single phase solution with the oil in place so that the oil can then be removed from the reservoir. This provides extremely effective displacement of the oil from the reservoir in the areas through which the solvent flows so that an extremely low residual saturation is obtained. The efficiency of this process derives from the fact that under the conditions of temperature and pressure prevailing in the reservoir, a two-phase system within the reservoir between the solvent and the reservoir oil is eliminated with the result that the retentive forces of capillarity and interfacial tension which are significant factors in reducing the recovery efficiency of oil in conventional flooding operations where the displacing agent and the reservoir oil exist as two separate phases are eliminated or substantially reduced.

Miscible recovery operations are normally carried out by a displacement procedure in which the solvent is injected into the reservoir to displace the oil from the reservoir and towards a production well from which the oil is produced. Because the solvent, typically a light hydrocarbon such as liquid petroleum gas (LPG) or a paraffin in the $C_2$ to $C_6$ range, may be quite expensive, it is often desirable to carry out the recovery by injecting a slug of the solvent, followed by a cheaper displacement liquid such as water.

Of the various enhanced oil recovery processes so far used or proposed, flooding by carbon dioxide is considered to be of substantial promise. In the $CO_2$ flooding technique, a slug of carbon dioxide is injected into the formation to mobilize the oil and permit it to be displaced towards a production well at an offset distance from the injection well. Carbon dioxide, however, is considered a miscible-type flooding agent because under supercritical conditions, usually high pressure, carbon dioxide acts as a solvent and in certain reservoir situations, has a great advantage over more common fluids as a displacement agent. Even under conditions where the carbon dioxide is not wholly effective as a solvent for the oil, recovery may be improved by taking advantage of the solubility of carbon dioxide in the oil, causing a viscosity reduction and a swelling of the oil, which leads to increased recovery. These effects have been utilized at pressures much lower than the miscibility pressures for carbon dioxide and oil. Processes using carbon dioxide as a recovery agent are described in U.S. Pat. Nos. 3,811,501; 3,811,502 and 4,410,043.

The principal advantage of dense phase or supercritical carbon dioxide as a displacement fluid is the demonstrably high microscopic efficiency, close to 100%, with which it can displace crude oil from porous matrices. One problem which arises, however, is that carbon dioxide is much less viscous than oil or water and the result of this is that the injected fluid does not displace the oil uniformly. Instead, the carbon dioxide moves faster in some regions and directions than in others and "viscous fingers" are formed through which most of the injected fluids flow. Some of these fingers may arrive prematurely at the production well, lowering the effectiveness of both the injected carbon dioxide and of the production pumping capacity.

Although only hydrocarbons of fairly low molecular weight are miscible in all proportions with liquid or dense phase, supercritical carbon dioxide, high displacement efficiencies may be attained even with oils containing higher molecular weight components; i.e. "black" oils because even though these oils are not first contact miscible with carbon dioxide and contain significant quantities of high molecular weight heavy ends that have very low solubility in carbon dioxide, the dynamic processes of extraction and flow during the early stages of displacement by carbon dioxide at high pressures causes a transition region to develop between the crude oil and the carbon dioxide containing dissolved lower molecular weight components and this zone having a composition gradient varying from the crude oil to the carbon dioxide, is fully miscible in the fluids bounding the zone. After development of this miscible zone, it can remain intact and displace essentially all of the oil along in its travel.

Regardless of whether the carbon dioxide removes the oil by first contact miscibility or the development of the transition zone of partly dissolved reservoir oil, the frontal instability which arises from the viscosity differences between the carbon dioxide and the reservoir oil disrupt the displacement patterns in the reservoir substantially.

In general, the methods used or proposed for the control of frontal instability entail the increase of the flowing pressure gradient behind the front, that is, a decrease in the displacing fluid's mobility. An initial proposal to decrease the effective mobility of the displacing fluid, so as to increase the pressure gradient in the region it occupied was to add water to the injection fluid in the process known as WAG, or water alternated with gas. Although this procedure has been adopted in a number of applications, there are problems with its effectiveness. First, the injected water may prevent the oil forming good contact with the displacement fluid and second, early breakthrough of the displacement fluid has apparently been a common occurrence in flood programs incorporating WAG. A second proposal has been to use a foam-like dispersion of dense-phase carbon dioxide in a surfactant solution since such composite fluids would have a decreased mobility through porous rock, apparently as a consequence of the formation and migration of the aqueous films in which most of the water present in the foam is transported. These films would separate the carbon dioxide into cells, preventing it from moving freely through the pore space.

A third method for controlling frontal instability has also been proposed. In this method, a polymer is dissolved in the dense-phase carbon dioxide to form a more viscous phase having a viscosity high enough for mobility control. Such a thickened carbon dioxide fluid would be especially advantageous in several ways because no added water would be required in its use. On a microscopic scale, the absence of added water would decrease the amount of oil which is by-passed or prevented from coming into contact with the displacing fluid and in addition, corrosion problems associated with the presence of water in the injected fluid would be obviated. The principal objection to this proposal, however, is that dense-phase carbon dioxide, although a solvent, is not a very powerful one and few, readily available polymers are soluble in carbon dioxide to any substantial extent. This is a serious problem in oil field operations because not only must the material have the desired chemical and physical characteristics but they must also be relatively cheap for the operation to be economically justified. The problem of limited solubility is exacerbated, moreover, by the fact that dissolved polymer will tend to come out of solution and be deposited in the lower pressure regions of the reservoir when these regions are reached by the thickened carbon dioxide.

SUMMARY OF THE INVENTION

I have now found that the solubility of polymers in dense-phase carbon dioxide may be enhanced by the use of certain entrainers which have an affinity for the carbon dioxide and for the polymer. Generally, these entrainers will be slightly polar organic compounds, for example, alcohols such as methanol or glycols although non-polar entrainers such as light hydrocarbons may also be employed. It is theorized that the polar entrainers may function in a manner similar to a surfactant in a water/hydrocarbon system, by its amphiphyllic character. Although dense phase carbon dioxide is non-polar, the polar portion of the molecule has an affinity for the dense-phase carbon dioxide and the non-polar portion has an affinity for the non-polar polymer. Non-polar entrainers may act in the manner of a mutual solvent for the polymer and the carbon dioxide.

According to the present invention, there is therefore provided a method for increasing the solubility of a polymeric material in dense-phase carbon dioxide by adding an entrainer to the carbon dioxide/polymer system. There is also provided a method for the enhanced recovery of oil from a subterranean, oil-bearing formation by injecting dense-phase carbon dioxide into the formation through an injection well into the formation under supercritical conditions and producing the oil at a production well, in which a polymer is added to the carbon dioxide to control the mobility of the carbon dioxide. In this method, the entrainer is used to improve the solubility of the polymer in the carbon dioxide.

DETAILED DESCRIPTION

In the enhanced recovery operations presently being considered, the carbon dioxide is used as a dense-phase displacement fluid. It is injected into the subterranean oil-bearing formation through an injection well to dissolve the oil present in the formation so that it can be displaced through the formation towards a production well which is situated at some offset distance from the injection well. This type of operation conveniently follows a secondary recovery operation such as a water flood and when the carbon dioxide flooding is complete, very low residual saturation will be attained. The method is applicable with many types of reservoir crudes of both high and low gravity. However, it is considered that its principal utility will be with oils having API gravities of from 25 to 45.

The carbon dioxide is injected so that under the conditions which prevail in the reservoir it is present as a dense phase, that is, it is under supercritical conditions and present neither as a liquid or a dense vapor. Generally, this will be achieved by maintaining pressure in the reservoir sufficiently high to maintain the carbon dioxide in the desired dense-phase state, i.e. at a density greater than approximately $0.4 g/cm^3$.

The minimum pressure necessary to maintain the dense-phase state increases with increasing reservoir temperature; the pressure should therefore be chosen in accordance with the reservoir temperature. Typical minimum pressures for maintaining the dense-phase state are 900 psia at 85° F., 1200 psia at 100° F., 1800 psia at 150° F., 2500 psia at 200° F. and 3100 psia at 250° F. (6205 kPa at 30° C., 8275 kPa at 38° C., 12410 at 65° C., 17235 kPa at 93° C., 21375 kPa at 120° C.).

The carbon dioxide contains a polymer which increases the viscosity of the displacement fluid. Although dense-phase carbon dioxide is non-polar and not a particularly strong solvent, there is a wide variety of lower molecular weight organic compounds which are soluble in it. However, because the lower molecular weight compounds generally do not have the thickening ability of the higher molecular weight polymers, they will not normally be suitable for present purposes. One further requirement for the polymer is that it should be insoluble in water so that it will not be leached out of the displacement fluid by the mobile and immobile water with which it come into contact in the reservoir. A secondary desirable requirement is that the polymer should produce a sufficient increase in viscosity at relatively low concentrations because only low concentrations of the polymer can be tolerated. The reason for this is that the dissolved polymer will tend to come out of solution and be deposited in the lower pressure regions of the reservoir when these regions are reached by the thickened carbon dioxide and some evaporation occurs. Finally, the polymer should be inexpensive for its use to be justified on an economic basis.

A number of high-molecular weight polymers have been found to be soluble to varying degrees in dense-phase carbon dioxide. In general, it has been found that the tacticity of polymers having ordered, stereoregular structures, plays an important role in determining the solubility of the polymer in carbon dioxide. For example, atactic polybutene and polypropylene oxide are soluble in carbon dioxide while the corresponding isotactic polymers did not dissolve. Thus, in general, the rubbery atactic polymers will be preferred over the crystalline, tactic polymers which are generally either difficult to dissolve in common organic solvents or require severe conditions for solution. It has also been found that the presence of aliphatic side chains on hydrocarbon polymer backbones is a characteristic of polymers which are soluble in carbon dioxide whereas the presence of aromaticity tends to reduce solubility. For example, polypropylene, polybutene, polydecene-1 and polyisobutylene were soluble while polystyrene, polyvinyl toluene-1 and polyvinyl biphenyl-4 were insoluble. However, polyvinyl napthalene-1 and polyacenapthalene exhibited solubility in carbon dioxide. Similarly, the presence of ether and estergroups as side chains is not detrimental to the solubility of the polymers in liquid carbon dioxide, especially when these groups are located between the polymer backbone and long aliphatic chains. For example, polyvinyl ethyl ether, poly n-decyl acrylate and poly n-lauryl methacrylate are soluble in liquid carbon dioxide. The solubility of the polymer in common organic solvents may be used as a preliminary indication of its suitability for use in the present method although recourse should be made to experiment for any individual polymer (to determine its solubility and viscosity modifying effect under the conditions contemplated) in order to determine its suitability.

Other non-polar polymers may also be soluble in dense-phase carbon dioxide, for example, polydimethyl polysiloxane and other silicone-containing polymers such as the silicone and polysiloxanes.

Although these polymers may not be soluble in supercritical carbon dioxide to a very great extent, the increase in viscosity which they provide when the entrainer is present to increase the solubility, may be enough for effective mobility control. Thus, polymer solubilities of at least 0.1, and preferably at least 0.5 g. polymer/liter $CO_2$ are contemplated for use according to the invention.

Table 1 below provides the solubilities of polymers which are considered to be soluble in dense-phase carbon dioxide. Table 2 provides similar information for $CO_2$-insoluble polymers.

TABLE 1

Polymers Soluble in Carbon Dioxide

| Polymer | Mol. Wt.[b] | Temp. °C. | Pressure PSI | Solubility of Polymer in $CO_2$ g./lit. |
|---|---|---|---|---|
| Poly(propylene) atactic | 5,916 Mv | 25 | 1960 | 2.2 |
| | | 32 | 1960 | 1.2 |
| Poly(butene) atactic | 434 Mv | 33 | 2600 | 8 |
| Poly(butene) atactic | 1,300 Mv | 30 | 3400 | 5.6 |
| Poly(decene) | | 25 | 2900 | 10.3 |
| Poly(isobutylene) | 501 Mv | 25 | 2950 | 4.0 |
| Poly(butadiene) | 5,095 Mv | 25 | 2800 | 2.5 |
| Poly(1-vinylnaphthalene) | | 25 | 3160 | 2.2 |
| Poly(acenaphthalene) | 216,000 Mv | 20 | 1500 | 0.25 |
| Poly(benzyl methacrylate) | | 25 | 2000 | 1.2 |
| | | 58 | 2500 | 1.2 |
| Poly(ethyl thiirane) atactic | | 25 | 3160 | 1.4 |
| Poly(vinyl ethyl ether) | | 25 | 2480 | 5.5 |
| Poly(dimethyl siloxane) | 135,000 Mw | 25 | 2750 | 0.3 |
| | | 52 | 2850 | 1.0 |
| Poly(methyl oxirane) atactic | 408 Mv | 25 | 2150 | 2.73 |
| Poly(2-methyl oxacyclo butane) | 4,200 Mn 9,000 Mw | 25 | 2060 | 1.75 |
| Terpene resin | | 25 | 1700 | 4.0 |
| Poly(n-decyl acrylate) | | 25 | 2400 | 2.38 |
| Poly(n-butyl methacrylate isobutyl methacrylate 50:50) | | 20 | 2200 | 0.6 |
| Poly(n-lauryl methacrylate) | | 25 | 2230 | 2.45 |

Note:
Mv = Viscosity Average Molecular Weight

TABLE 2

Polymers Insoluble in Carbon Dioxide

| Polymer | Mol. Wt.[b] | Temp. °C. | Pressure PSI |
|---|---|---|---|
| Poly(butene) isotactic | — | 25 | 3000 |
| Poly(isoprene) cis | — | 25 | 2200 |
| Poly(norbornene) | 2,000,000 | 25 | 2800 |
| | | 50 | 2800 |
| Poly(2-vinyl pyridine) | — | 25 | 1700 |
| Poly(octadecene-maleic anhydride) | 50,000 | 30 | 2500 |
| | | 40 | 2500 |
| Poly(styrene-maleic anhydride) | 10,000 | 25 | 2800 |
| | | 50 | 2800 |
| Poly(vinylidene fluoride) | — | 28 | 2600 |
| | | 38 | 2600 |
| Poly(caprolactone) | 10,000 | 25 | 2900 |
| | | 40 | 2900 |
| Poly(vinyl formal) | 10,000 | 25 | 2800 |
| Poly(vinyl chloride) | 80,000 | 25 | 2800 |
| Poly(vinyl pyrrolidone) | 10,000 | 35 | 2500 |
| Poly(ethylene oxide) | 600,000 | 25 | 3300 |
| Poly(propylene oxide) isotactic | 66,162 Mv | 25 | 3500 |
| Poly(acrylonitrile) | 158,900 Mv | 25 | 2600 |
| Poly(methyl thiirane) | 500,000 | 25 | 2600 |
| Nylon II | | 25 | 1800 |
| Poly(styrene) | 10,940 Mv | 25 | 2200 |
| Poly(carbonate) | 36,000 | 25 | 2800 |
| | | 40 | 2800 |
| Poly(4-vinyl biphenyl) | — | 25 | 2100 |
| | | 31 | 2100 |

TABLE 2-continued

| Polymers Insoluble in Carbon Dioxide | | | |
|---|---|---|---|
| Polymer | Mol. Wt.[b] | Temp. °C. | Pressure PSI |
| Poly(octadecyl acrylate) | 23,300 Mw | 25 | 2140 |
|  | 13,000 Mn |  |  |
| Poly(octadecyl methacrylate) | 671,000 Mw | 25 | 2420 |
|  | 97,200 Mn |  |  |
| Poly(vinyl toluene) |  | 25 | 2500 |
| Poly(tetrafluoro ethylene) |  | 25 |  |

Note:
Mv = Viscosity Average Molecular Weight

Although certain polymers may be soluble in dense-phase carbon dioxide, the increase in viscosity which they produce is, however, generally insufficient to stabilize the displacement front in the reservoir. However, it is proposed according to the present invention to increase solubility of polymers by the use of entrainers. The entrainers which are used are normally slightly polar, low molecular weight organic compounds which are soluble in dense-phase carbon dioxide themselves and act as mutual solvents for the carbon dioxide and the polymer. By increasing the solubility of the polymer in the carbon dioxide, the viscosity of the displacement fluid may be increased by a sufficient amount for effective mobility control in flooding operations. The entrainers will normally have a measurable dipole moment indicating their polar nature and will normally be low molecular weight organic compounds having polar side chains such as hydroxyl, although non-polar entrainers may also be used, although to less advantage since they bring about a smaller increase in solubility. Alcohols are particularly preferred, including monohydric alchols such as methanol, ethanol, propanol, butanol, glycols such as ethylene glycol, diethylene glycol, triethylene glycol or higher poly-glycols which are more viscous and are known to be soluble in supercritical carbon dioxide. Polyglycols are known compounds which are widely available commercially under various trademarks such as the Ucon fluids of Union Carbide and Selexol of Norton Company (Akron, OH). They are typically produced by the addition of an alkylene oxide, normally ethylene oxide or propylene oxide, to a hydroxyl group desired, for example, from an alcohol, a glycol or a fatty acid; by varying the amount of alkylene oxide relative to the hydroxylic compound, the molecular weight of the product may be controlled. By changing the nature of the active hydrogen containing compound, the nature of the end groups on the polyglycol is changed, e.g. alcohols produce polyglycol diols and carboxylic acids produce polyglycol esters:

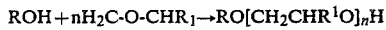

$$ROH + nH_2C\text{-}O\text{-}CHR_1 \rightarrow RO[CH_2CHR^1O]_nH$$

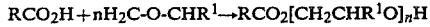

$$RCO_2H + nH_2C\text{-}O\text{-}CHR^1 \rightarrow RCO_2[CH_2CHR^1O]_nH$$

Polyglycol terminated in hydroxyl groups may be capped by reaction with capping agents such as fatty acids, acyl chloride or acyl anhydrides to produce ester-terminated polymers.

Polyglycols are available commercially for various purposes, e.g. as lubricants. The Selexol (trademark) polyglycols, which are used widely for the drying of natural gas streams, are a mixture of dimethyl ether and polyethylene glycols and are soluble in supercritical carbon dioxide at levels of several mole percent.

Non-polar entrainers which may be used although they improve the solubility of the polymers to a lesser extent would include light hydrocarbons, e.g. $C_4$–$C_6$ hydrocarbons such as butane or hexane.

The amounts of polymer and entrainer which are used will depend upon the desired increase in viscosity and the identities of the selected polymer and entrainer. The desired viscosity will be determined at least partly by reservoir factors such as porosity and viscosity of the oil to be displaced; the polymer and the entrainer may likewise have to be selected according to reservoir characteristics, e.g. to avoid excessive adsorption by matrix rock or adverse chemical reaction with it. When these factors are known, the appropriate amounts may be selected. With relatively small concentrations, e.g. 3 mol percent, of polar entrainers, the solubilities of certain polymeric hydrocarbons may be increased by a factor of ten as compared to their solubilities with no entrainer present. With non polar entrainers, the solubilities may be increased by a factor of up to five at similar entrainer concentrations. The amount of entrainer will therefore be in the range of up to 3 mole percent based on the carbon dioxide with the amount of polymer being up to the limit of its solubility in the carbon dioxide in the presence of the entrainer.

I claim:

1. A method for increasing the solubility of a polymer in dense-phase carbon dioxide, which comprises dissolving a substantially water-insoluble polymer in dense-phase carbon dioxide in the presence of an entrainer which is soluble in the dense phase carbon dioxide.

2. A method according to claim 1 in which the entrainer is a polar, organic compound.

3. A process according to claim 2 in which the entrainer is an alcohol.

4. A process according to claim 2 in which the entrainer is a glycol.

5. In a method for the recovery of oil from a subterranean, oil-bearing formation by injecting carbon dioxide into the formation through an injection well into the formation under supercritical conditions and recovering oil and injected carbon dioxide from a production well at a distance from the injection well, the improvement which comprises controlling the mobility of the carbon dioxide in the reservoir by means of a substantially water-insoluble polymer dissolved in the carbon dioxide under supercritical conditions, in an amount sufficient to effect mobility control of the carbon dioxide.

6. A method according to claim 5 in which the polymer is dissolved in the carbon dioxide in the presence of an entrainer compound which is soluble in the carbon dioxide.

7. A method according to claim 6 in which the entrainer comprises a polar organic compound.

8. A method according to claim 7 in which the entrainer comprises a hydroxylic organic compound.

9. A method according to claim 8 in which the entrainer comprises an alcohol.

10. A method according to claim 8 in which the entrainer comprises a glycol.

11. A method according to claim 8 in which the entrainer comprises a non-polar organic compound.

12. A method according to claim 11 in which the entrainer comprises a $C_4$–$C_6$ hydrocarbon.

13. A method according to claim 5 in which the polymer is an atactic hydrocarbon polymer.

* * * * *

Notice of Adverse Decision in Interference

In Interference No. 101,920, involving Patent No. 4,609,043, A. S. Cullick, ENHANCED OIL RECOVERY USING CARBON DIOXIDE, final judgment adverse to the patentee was rendered Sept. 22, 1989, as to claims 1-13.

[*Official Gazette November 21, 1989*]